HIGH RESOLUTION RING-TYPE COUNTER

Filed May 23, 1960 5 Sheets-Sheet 1

ZOLTAN TARCZY-HORNOCH
INVENTOR
BY Flehr and Swain
ATTORNEYS

HIGH RESOLUTION RING-TYPE COUNTER

Filed May 23, 1960 5 Sheets-Sheet 2

ZOLTAN TARCZY-HORNOCH
INVENTOR
BY [signature]
ATTORNEYS

Sept. 24, 1963 Z. TARCZY-HORNOCH 3,105,195

HIGH RESOLUTION RING-TYPE COUNTER

Filed May 23, 1960 5 Sheets-Sheet 3

ZOLTAN TARCZY-HORNOCH
INVENTOR

BY [signature]
ATTORNEYS

ZOLTAN TARCZY-HORNOCH
INVENTOR
BY Flehr & Swain
ATTORNEYS

ZOLTAN TARCZY-HORNOCH
INVENTOR
BY Flehr Hohbach Swain
ATTORNEYS

United States Patent Office 3,105,195
Patented Sept. 24, 1963

3,105,195
HIGH RESOLUTION RING-TYPE COUNTER

Zoltan Tarczy-Hornoch, Berkeley, Calif., assignor, by mesne assignments, to W. K. Rosenberry, Piedmont, Calif., doing business as Able Research Lab., Berkeley, Calif.

Filed May 23, 1960, Ser. No. 31,102
4 Claims. (Cl. 328—43)

This invention relates to multi-stable state circuits and more particularly to circuits of this type which are free running or externally triggered.

In making counts and time interval measurements by conventional methods, cascaded binary stages have been utilized. These cascaded stages have been connected in such a manner that the input pulses are all applied to the first stage of the series so that the rate with which counting can be accomplished, or the minimum separation between two successive pulses which can be resolved, or the shortness of the time interval which can be measured is limited by the resolution of the first binary stage. These limitations are all the more evident in a scale of ten device because normally four binaries with two feedback loops are required. These feedback loops seriously limit the resolution of the device. There is, therefore, a great need for a device or circuitry which will make possible very rapid counting and also make possible accurate measurement of very short time intervals.

In general, it is an object of the invention to provide a multi-stable state circuit of the above character in which the resolution of the circuit is not limited by the resolution of the first stage of binary of the circuit.

Another object of the invention is to provide a circuit of the above character which has a counting rate which is approximately equal to the multiple of the number of binaries and the counting rate of a single binary.

Another object of the present invention is to provide a multi-stable state circuit of the above character in which the counting rate ability of the circuit can be increased within its double pulse resolution merely by increasing the number of stages or binaries in the circuit.

Another object of the invention is to provide a circuit of the above character which is particularly adapted for use in time interval measurements, and particularly for short time intervals.

Another object of the invention is to provide a circuit of the above character which is particularly adapted for scaling or counting.

Another object of the invention is to provide a circuit of the above character which is particularly adapted for use in making digital time interval measurements.

Another object of the invention is to provide a circuit of the above character which is particularly adapted for use in decade counting.

Additional objects and features of the invention will appear from the following description in which the preferred embodiments have been set forth in detail in conjunction with the accompanying drawings.

Referring to the drawings.

In general, the present invention consists of a multi-stable state circuit which is particularly adapted for making short interval time measurements and for use in rapid counting or scaling. It consists of a plurality of cascaded or serially connected binaries in which the output of the last binary in the cascade is connected to the input of the first binary in the cascade. Gates are connected to the inputs of the binaries so that the multi-stable state circuit can be utilized either for making short interval time measurements or for rapid counting or scaling. By connecting the binaries in this manner, the counting rate ability of the circuit is equal to the multiple of the number of binaries and the resolution of each stage.

Figure 1:
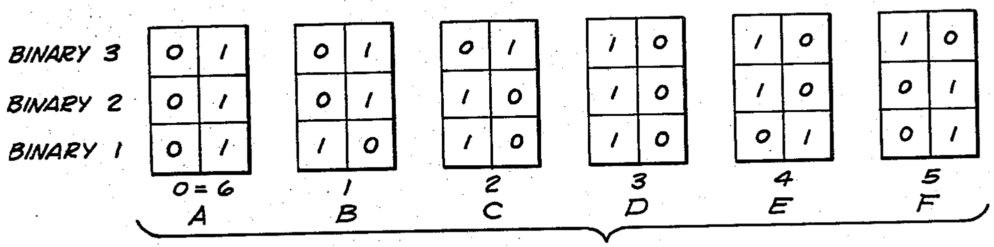
FIGURES 1A, 1B, 1C, 1D, 1E and 1F show a plurality of block diagrams incorporating my multi-stable state circuit and disclosing its principle of operation.

In FIGURE 1, I have shown in block diagram form a multi-stable state circuit which is comprised of three binaries. As is well known to those skilled in the art, a binary is a bistable device which has two stable states.

The number of stable states possible with a given number of binaries in my multi-stable state circuit is given by the formula below $$S=2n$$

where S is equal to the number of stable states, and where $n$ is equal to the number of binaries. Thus, where three binaries are utilized as in the embodiment shown in FIGURE 1, six stable states are possible. These six stable states are shown in the various block diagrams in FIGURE 1. The two stable states of each binary are indicated as side A and as side B. When the binary consists of a conventional vacuum tube circuit comprised of two tubes, a binary is in one stable state when one tube is conducting and the other tube is not conducting and is in the other stable state when said one tube is not conducting and the other tube is conducting. In FIGURE 1, conventional designations are utilized to indicate the conducting and non-conducting sides of the binaries. Thus, since the conducting sides represent a 1 and the non-conducting sides represent a 0, they bear the respective binary notations of 1 and 0.

When the device is at rest or in a reset position, the binaries are connected in such a manner that all of the B sides of the binaries are conducting and the A sides are non-conducting as shown in FIGURE 1A. This block is designated as the zero or number 6 block. Upon application of a pulse to the first binary of the device in the state shown in FIGURE 1A, binary 1 is transferred to its other stable state as indicated by the block diagram in FIGURE 1B and designated as number 1 block. Thereafter if the device is connected to operate as a time interval measuring device, the transfer of the first binary to its second or other stable state would cause the second binary to transfer to its second stable state as shown in FIGURE 1C. Transfer of the second binary to its second stable state would then cause transfer of the third binary to its second stable state as shown in FIGURE 1D. Transfer of the third binary to its second stable state would, in turn, cause transfer of the first binnary to its first stable state as shown in FIGURE 1E and so forth to provide the six stable states shown. Repeated transfer through the six stable states will continue until the application of a stop pulse to the device as hereinafter described. Additional stable states can be obtained merely by the use of additional binaries.

When the device shown in FIGURES 1A to 1F is connected for counting or scaling, the application of a second pulse causes the transfer of the second binary to its second stable state; the receipt of a third pulse causes the transfer of the third binary to its second stable state and so on. The application of a series of pulses causes the device to go through repeatedly the six stable states shown in FIGURES 1A to 1F.

Thus, when the device shown in FIGURES 1A to 1F is utilized as a free running device for making short interval time masurements, the device operates on a base of six and proceeds from 0 to 5 and returns to 0 or 6 to repeat the sequence until stopped by a stop pulse. In the same manner, when the device shown in FIGURES 1A to 1F is utilized for counting pulses, it also operates on a base of six and goes through the same sequence as the pulses are applied sequentially to the binaries.

Figures 2, 3:
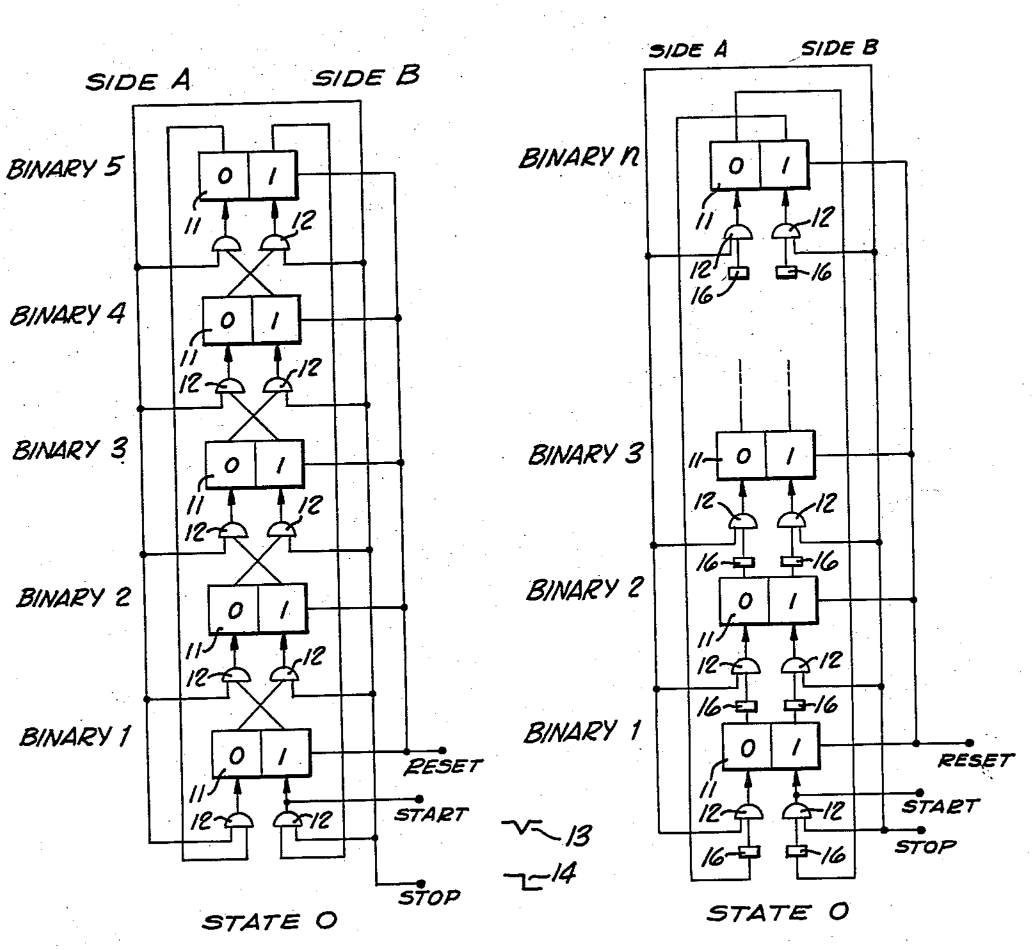
FIGURE 2 is a more detailed block diagram embodying my invention utilized as a device for time interval measurement.
FIGURE 3 is a block diagram similar to that shown in FIGURE 2 with the exception that phase inverting means is included.

A more detailed description of how my multi-stable state circuit operates when utilized as a device for making short time interval measurements may be seen with reference to FIGURE 2. In the embodiment shown in FIGURE 2, five binaries 11 are utilized for making the device particularly useful for decimal time interval measurements. Each of the binaries is shown as having two sides, side A and side B. Each of the binaries also has two inputs and two outputs as shown in the drawings. The two inputs of each of the binaries are connected to two gates 12 which control the application of pulses or signals to the binaries. The binaries are connected serially or in cascade and into a closed loop with the outputs of the last binary being connected to the inputs of the first binary in the cascade or series. It will be noted, however, that the outputs of the binaries are connected to the opposite sides of the succeeding binaries because of the phase inversion which takes place within the binaries themselves as hereinafter explained.

When the binaries in the block diagram in FIGURE 2 are in a reset or state zero position, all the binaries are in the same stable state, that is, with sides B conducting as shown in the diagram. The gates connecting the outputs of the preceding binaries to the inputs of the succeeding binaries are all on or open. When a start pulse 13 such as that shown in FIGURE 2 is applied to the start terminal, the first binanry is shifted from its present or first stable state to its other or second stable state or in other words, side B is made non-conducting and side A is made conducting. Binary 1 is connected to binary 2 in such a manner that when binary 1 is shifted to its other stable state, binary 2 is shifted to its other stable state. Shifting binary 2 to its other stable state causes binary 3 to be shifted to its other stable state and this continues until all five binaries are in the other stable state, that is, with all of the side A's conducting and all of the side B's non-conducting. Shifting of binary 5 to its other stable state causes the binary 1 to be shifted to its original state. This free-running action continues until a stop pulse 14 is applied to the stop terminal in FIGURE 2. The application of a stop pulse turns all of the gates off or closed to prevent the triggering of the next binary. The binaries, therefore, remain in the stable states they were in at the time of application of the stop pulse. The device can be reset in a conventional manner through the reset terminal.

Specifically, when a start pulse is applied to the first binary to turn the on side to off and the off side to on, the turning of the off side to on produces an output which is applied to the on side of the second binary to turn it to off. Turning the on side to off of the second binary causes the off side to be turned on which produces an output which causes the "on" side of the third binary to be turned off. This operation continues until a stop pulse is applied to the circuitry as hereinbefore explained.

It will be noted that in FIGURE 2, five binaries have been utilized which adapts it particularly for decimal time interval measurements. It will be appreciated, however, that any desired number of stages can be utilized.

The operation of the embodiment shown in FIGURE 3 is very similar to that of the multi-stable device shown in FIGURE 2. N binaries have been utilized as indicated by the last binary. Phase inverting devices 16 have been provided at each output of the binaries to create phase inversion in the output signals of the binaries. This is to compensate for the phase inversion between the inputs and the outputs of the same sides of the binaries. Thus, in place of the crisscross connections utilized in FIGURE 2 vertical in-line connections are made. When connected in the manner shown in FIGURE 3, when an on side is switched to off, an output signal is suppled to the "on" side of the succeeding stage to cause it to be switched from "on" to "off" and to cause the other side to be switched from off to on. This same sequence is repeated as the other binaries are switched.

The circuitry of FIGURE 3 is advantageous because it makes possible higher speed operation. The higher speed operation is made possible because the positive going waveform from the output of the binary is utilized by the phase inverter rather than the negative going waveform. This is true because the positive going waveform follows the trigger pulses more rapidly than the negative going waveform.

Figure 4:
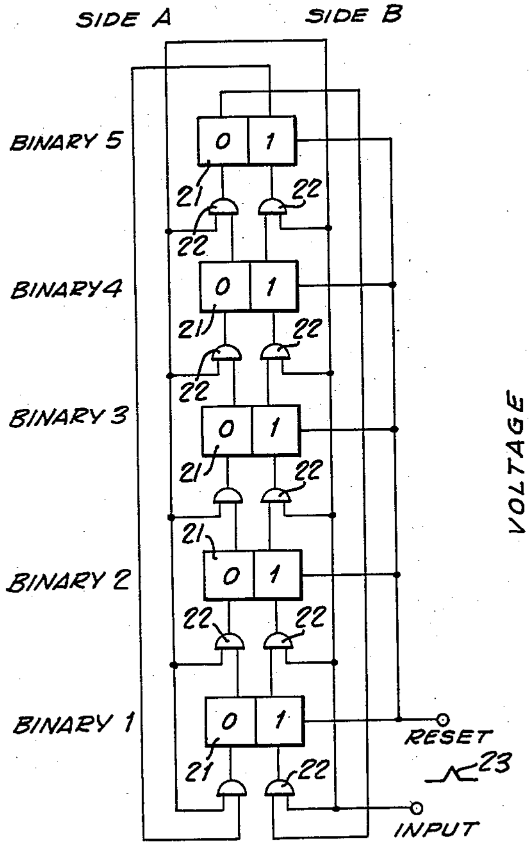
FIGURE 4 is a block diagram of another embodiment of my invention utilized as a device for scaling or counting.

Another embodiment of my invention is shown in FIGURE 4 which is adapted particularly for scaling or counting. It consists of a plurality of binaries 21 and a plurality of gates 22 connected to the inputs to the binaries. Where the gate inputs are connected to the off or non-conducting sides of the binaries, the gates are open or on.

When the multi-stable state device is in the state zero or reset position as shown in FIGURE 4, all of the right hand sides or the B sides are conducting and all of the left hand sides are non-conducting. All of the gates having inputs connected to non-conducting or off binaries are open or on. Thus, when an input pulse 23 is applied to the input terminal, the input pulse 23 is applied to the on side of the first binary because the gate connected to the input of this side of the binary is open. The gate 22 connected to the on side input of the binary 1 is open because the input to this gate is connected to the output of the off side of the binary 5. The input pulse 23 is only applied to the on side of the first binary because the gates connected to the other on sides of the binaries are closed and the gates which are open are connected to the off sides of the binaries. For that reason, when the first input pulse is applied to the multistable state circuit in FIGURE 4, it can only effect the on side of the first binary.

The receipt of a pulse by the on side of binary 1 switches the on side to off and the off side to on. Turning the on side of the first binary to off opens the gate connected to the output thereof so that the next input pulse which is applied to the input terminal will be received by the on side of the second binary and counted or scaled by the second binary. All of the other gates to the on sides of the binaries are closed and the other gates which are open are connected to off sides of binaries so that the second input pulse is only applied to the on side of the second binary. The receipt of the second pulse by the second binary causes the on side to be switched to off which causes the gate connected thereto to be opened so that the on side of the third binary can receive the third input pulse. This sequence of operation continues so that after five pulses have been received, all five binaries in the circuit of FIGURE 4 have been switched from their first stable state to the second stable state or in other words in which the left hand sides or A sides are conducting and the right hand or B sides are nonconducting.

Upon receipt of the sixth input pulse, the pulse is applied to the side A of binary 1 because side A is conducting and because the gate connected to side A of binary 1 is open. This gate is connected to the off side of binary 5. This sequence of operation continues, that is, the input pulses are counted or scaled by the multi-stable state device in a sequential manner. By attaching appropriate indicating devices to each of the binaries in a manner well known to those skilled in the art, the number of counts which have been received by the multi-stable state device can be readily determined at any time. The multi-stable state device can be reset in a conventional manner through the reset terminal.

Figure 5:
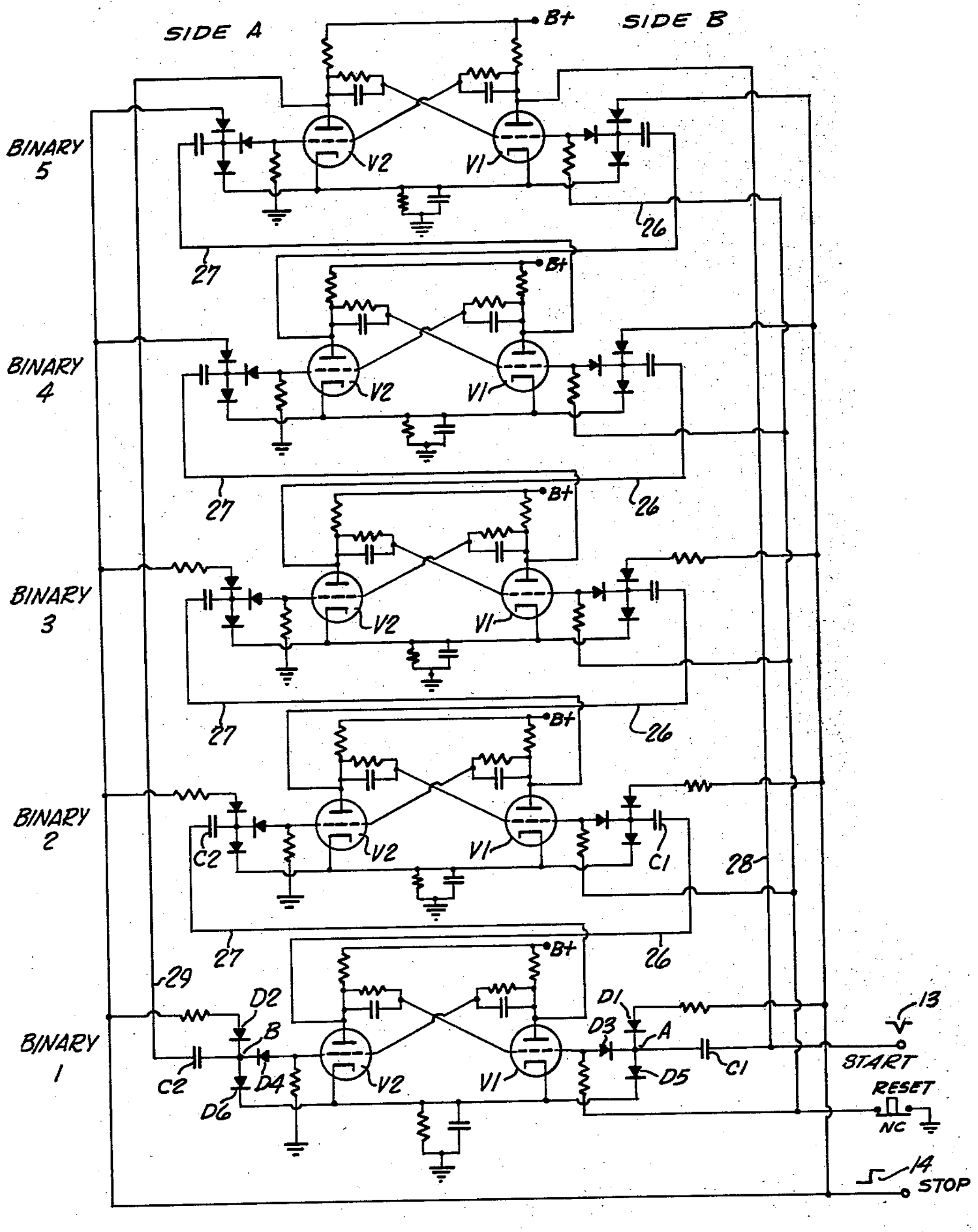
FIGURE 5 is a detailed circuit diagram of a plurality of binaries connected in the manner shown in block diagram in FIGURE 2 to provide a free running multi-stable state device suitable for time interval measurements.

In FIGURE 5 I have shown a detailed circuit diagram of a plurality of binaries connected in the manner shown in the block diagram in FIGURE 2 to provide a free running multi-stable state device suitable for time interval measurements. The binaries utilized in FIGURE 5 are substantially conventional and are of a type well known to those skilled in the art. Each of the binaries consists of a pair of suitable non-linear active devices such as vacuum tubes, transistors, tunnel diodes, and other semiconductor devices. In FIGURE 5 vacuum tubes $V_1$ and $V_2$ are utilized and are connected in such a manner that the output of one is fed back to the input of the other to provide an arrangement which is commonly known as a flip-flop. The flip-flop or binary can exist in either of two stable states; that is, with tube $V_1$ conducting or with tube $V_2$ conducting. When tube $V_1$ is conducting, its low plate potential is applied to the grid of the tube $V_1$ to hold it in a cut-off position and the high plate potential of the tube $V_1$ is applied to the grid of the tube $V_2$ to maintain conduction. Similarly, if tube $V_2$ is conducting initially, the tube $V_1$ will be cut-off and the two tubes will maintain each other in this stable state. By the application of pulses to the grids of the tubes through the input capacitors $C_1$ and $C_2$, the flip-flop can be flipped from one stable state to the other. Thus, assuming that tube $V_1$ is conducting initially, and a negative pulse is applied to the input terminal through the capacitor $C_1$ and to the grid of tube $V_1$, a reduction of current flow will occur in tube $V_1$ which will cause an increase in the plate potential of the tube $V_1$. This increased plate potential of the tube $V_1$ is applied to the grid of the tube $V_2$ which is sufficient to allow the tube $V_2$ to start conducting. This will cause a drop in the plate potential of the tube $V_2$ which will appear at the grid of tube $V_1$ to drive the grid of tube $V_1$ more negative. Once this process is started, it will continue until the other state is reached because of the amplification provided by the two tubes in the loop.

When the flip-flop changes from one stable state to another, the output signal which is negative going at the time is utilized to flip another flip-flop or binary as hereinafter described. In the circuit diagram shown in FIGURE 5, five binaries of the above type are utilized and are numbered binaries 1 to 5. Because ordinarily a negative going pulse can only be used to switch a flip-flop from one stable state to the other, a criss-cross arrangement is utilized for connecting the binaries. Thus, the plate of tube $V_2$ is connected to the grid of the tube $V_1$ of binary 2 by a conductor 26 and the tube $V_1$ is connected to the grid of the tube $V_2$ by a conductor 27. The succeeding binaries are connected in the same way so that it can be said that they are serially connected or connected in cascade. The last binary in the cascade has its outputs connected to the inputs of the first binary by the conductors 28 and 29 to provide a closed loop.

Operation of the circuitry shown in FIGURE 5 may now be described briefly as follows: When a negative input pulse 13 is applied to binary 1, binary 1 is switched from one stable state to the other stable state, that is, tube $V_1$ is rendered non-conducting and tube $V_2$ is rendered conducting. The negative going signal from the output of tube $V_2$ as it begins conducting is applied to the input grid of tube $V_1$ of binary 2 to switch binary 2 from one stable state to the other stable state. The negative going pulse from the switching of the binary 2 is utilized for switching binary 3. This is the same sequence which continues through binaries 4 and 5. Switching of binary 5 causes a negative going pulse to be applied through conductor 29 to the grid of tube $V_2$ to switch binary 1 to its original stable state by making tube $V_2$ non-conducting and tube $V_1$ conducting. This sequence of operation continues to provide what may be called a free running digital oscillator.

Free running of the multi-stable state circuit continues until a stop pulse or waveform 14 is applied to the stop terminal to signify determination of the interval of interest. All of the stages or binaries are cut off by the stop waveform 14 so that no negative pulse, external or internal, can be received by the next stage. The multi-stable circuit is maintained in the condition in which it was found when the stop pulse was applied to the circuit. The cut off of all of the binaries is accomplished by the diode gates D1 and D2. When the multi-stable state device is free running, the stop waveform 14 is at a low potential level so that the diodes D1 and D2 are non-conducting. When the voltage applied to the diodes D1 and D2 of each of the binaries by the stop pulse is suddenly increased to a level which is high enough to cause conduction of the diodes D1, D2, D5 and D6, the current flow past junctions A and B will prevent the application of a negative pulse external or internal to any of the binary stages of the multi-stable state device. The diodes D3 and D4 are used as conventional disconnecting diodes. When a negative step function is applied to one of these diodes, the diode will transfer the pulse to the grid until the grid becomes more negative than the cathode of the diode.

Figure 6:
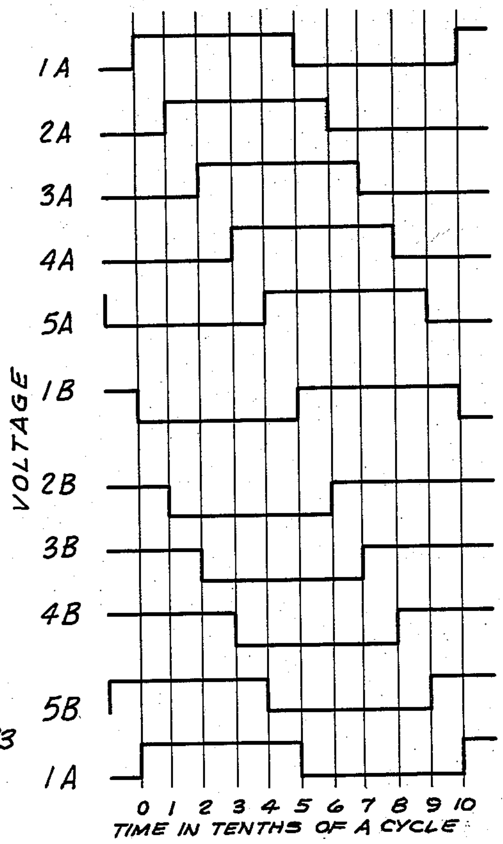
FIGURE 6 is a graph showing the voltage-time curves of the circuit shown in FIGURE 5.

Typical waveforms of the circuit shown in FIGURE 5 are shown in FIGURE 6. As can be seen from FIGURE 6, curve 1A which represents the output voltage of tube $V_1$ of binary 1 starts its cycle at zero, whereas curve 2A which represents the output voltage of the tube $V_1$ of binary 2 starts its cycle one-tenth of a cycle later. This continues through the curve 5A which represents the output voltage of the tube $V_1$ of binary 5. Thereafter, the other sides of the binaries oare rendered conducting and the output curves 1B through 5B are produced by the tubes $V_2$ of the binaries, after which the same sequence is repeated beginning with the curve 1A. This type of operation continues until stopped as hereinbefore described.

Thus, the circuit is free running or oscillates continuously in a digital manner. Each binary stage operates at the same speed and each stage switches the succeeding stage to provide a multi-stable state circuit which operates much more rapidly than conventional binary chains. The five binary stages can transform ten discrete single steps to provide a scale of ten circuit. A circuit having a scale of $n$ when $n$ is an even number can be accomplished very easily merely by increasing or decreasing the number of stages. A scale of ten circuit has been shown because it would be one of the most useful circuits in time interval measuring. However, it is readily apparent that a scale of 6 or a scale of 12 circuit could be provided, if desired.

The resolution of my multi-stable circuit is much greater than that of conventional binary chains because the recovery time of each of the binaries is not a limiting factor. A binary can switch a succeeding stage in a much shorter time than it can be switched a second time. For a binary to be switched a second time, an interval of time is required which includes the following times—the time required to apply a triggering pulse, a delay time for charging up the capacities of the circuit before switching occurs, the time required for regeneration and for switching, and then the time required for recovery or dead time until the circuit assumes its original sensitivity so that it can receive a second pulse, or in other words, capable of being switched a second time. These times, therefore, determine the resolution of the binary.

When binaries are connected in the manner shown in FIGURE 5, the succeeding binary is triggered as soon as the switching waveform of the previous binary reaches a level sufficient to trigger the succeeding binary. The succeeding binary is in its original undisturbed state and is at its full sensitivity. On the other hand, at the same instant of time, the tube to which the start pulse has been applied is at maximum insensitivity and remains in this insensitive condition for a long period of time determined by the recovery time of the circuit. The succeeding binary can be switched in a very short time after the preceding binary has been switched in comparison to the recovery time for the preceding binary. At a certain time during the switching time such as the half-way point in the switching time, it is possible to start triggering the succeeding stage. Therefore, it is possible to save all of the recovery time and a portion of the switching time. However, it is not possible to eliminate the triggering time or a portion of the switching time.

It is, therefore, apparent that during the triggering of the succeeding binary stages, the preceding binaries are given sufficient time to complete the switching and to recover. Thus, in the circuit shown in FIGURE 5, the first binary triggered has time to recover while the four succeeding binaries are triggered.

Figure 7:
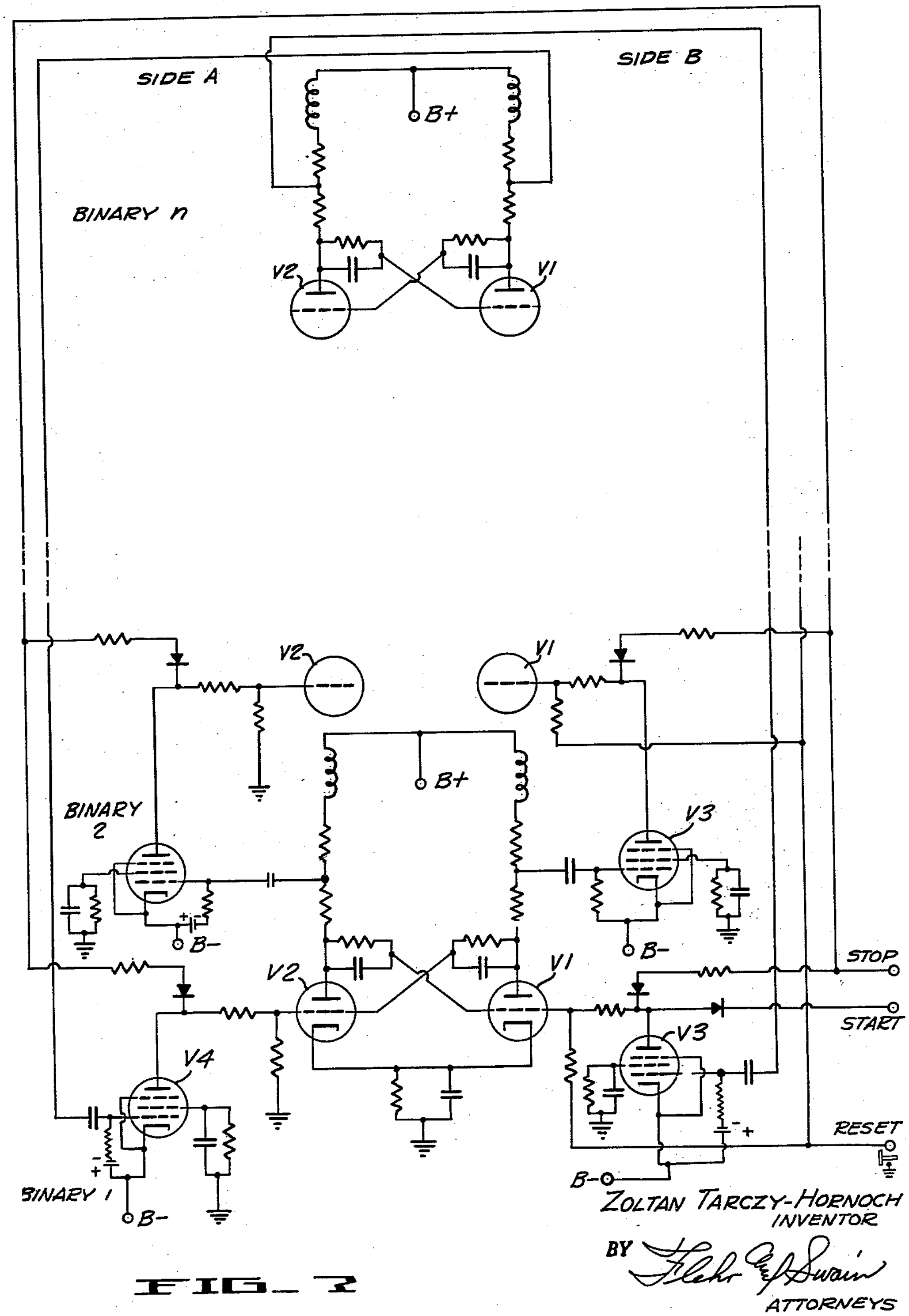
FIGURE 7 is a detailed circuit diagram showing a plurality of binaries connected in the manner shown in block diagram form in FIGURE 3.

Another embodiment of my invention is shown in FIGURE 7 in which a plurality of binaries are connected in the manner disclosed in block diagram form in FIGURE 3. The binaries are numbered 1 through *n* and indicate that any number of binaries can be utilized. It will be noted that each of the binaries had a marked similarity to the binaries shown in FIGURE 5. Additional phase inverting circuitry for each of the binaries is provided and can be in any suitable form such as the tubes $V_3$ and $V_4$ shown. Other phase inverting devices such as transformers or transistor circuitry can be used.

When a start pulse is applied to the start terminal, the tube $V_1$ is rendered non-conducting and the tube $V_2$ is rendered conducting. The positive going signal from the output of the tube $V_1$ is applied to the grid of the phase inverting tube $V_3$ which is normally biased beyond cut-off. Application of the positive pulse causes the tube $V_3$ to conduct to cause it to generate a negative going pulse which is utilized for triggering the succeeding binary.

The nature of the binary circuit is such that when a negative pulse is applied to the conducting side of the binary, the resulting switching first produces a positive going waveform at one output and then a succeeding negative going waveform at the other output. Consequently, by inverting the positive going waveform to produce a negative signal with my phase inverting means, it is possible to produce a negative signal sooner than the negative going signal of the binary.

It is readily apparent by utilizing such phase inverting means the criss-cross arrangement shown in FIGURE 5 is not necessary and that the right hand tubes will be successively rendered non-conducting, after which the left hand tubes will be successively rendered non-conducting as the circuitry continues to run freely until a stop pulse is applied in much the same manner as described in conjunction with FIGURE 5.

The digital oscillators in FIGURES 5 and 7 both advance from state to state after a start pulse has been applied and will be stopped only upon application of a stop pulse. The number of steps will be proportional to the elapsed time. Therefore, the digital oscillators can be used for time interval measurements. If the time interval to be measured is longer than the full cycle of the digital oscillator, then the number of cycles can be counted by conventional decimal counting means.

To obtain additional stability, the multi-stable state circuit can be synchronized to a crystal controlled oscillator which would control the switching frequency of the digital oscillator. By locking the digital oscillator onto a crystal controlled sine wave oscillator, the accuracy of the digital oscillator circuit can be made as good as that of the crystal controlled oscillator.

Using visual or electrical readout devices with such time interval measuring devices is greatly simplified because of the straight decimal arrangement of the multi-stable state circuit.

Figure 8:
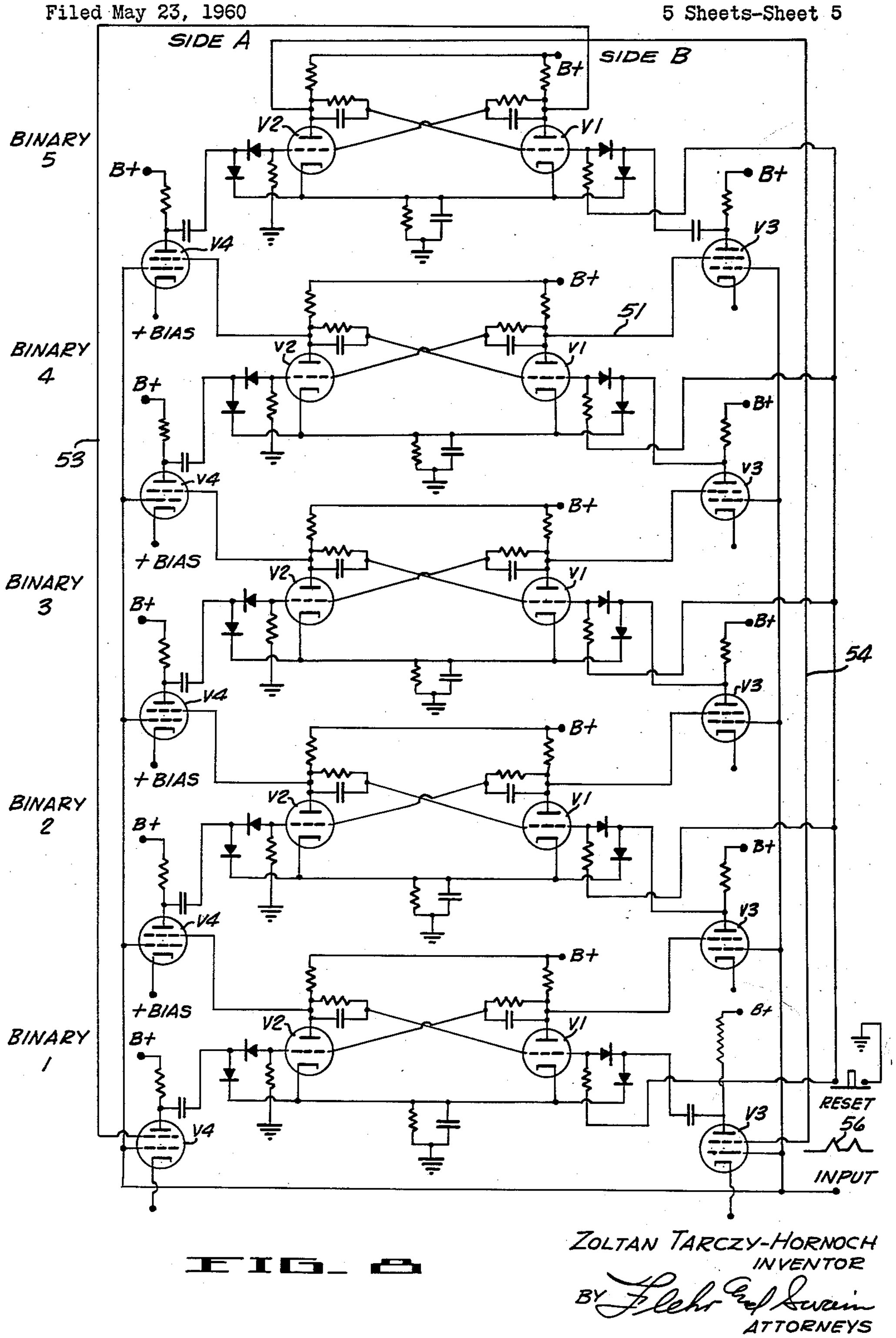
FIGURE 8 is a circuit diagram showing a plurality of binaries connected in the manner shown in the block diagram in FIGURE 4.

Still another embodiment of my invention is shown in the circuit diagram of FIGURE 8 in which a plurality of binaries are connected in the manner shown in the block diagram in FIGURE 4. The multi-stable state device consists of five binaries which are substantially identical to the binaries shown in FIGURE 5. Each of the binary stages is provided with a pair of gates in the form of dual-control grid gating tubes $V_3$ and $V_4$, which have one control grid connected to the input terminal and the other control grid connected to the output plate circuit of the tube of the preceding stage on the same side of the binary by conductors 51 and 52. The plates of the gating tubes $V_3$ and $V_4$ are connected to the input circuits of the binary tubes $V_1$ and $V_2$.

The last binary in the series or cascade is connected to the first binary in the series to also provide a closed loop in a similar manner as in the previous embodiments. Thus, the plate of the tube $V_1$ of binary 5 is connected by a conductor 53 to one of the control grids of the dual-control grid tube $V_4$ which is connected to the opposite side of the binary 1. In the same manner, the plate of the tube $V_5$ of binary 5 is connected to one of the control grids of the gating tube $V_3$ for the other side of binary 1 by a conductor 54.

Operation of this embodiment of my invention may now be briefly described as follows. Let it be assumed that the multi-stable state circuit shown in FIGURE 8 is in a reset condition, that is, with all of the tubes on side B conducting so that all of the binaries are in the same stable state. When this is the case, the only open gate which is connected to the on side of a binary is the gating tube $V_3$ connected to the conducting tube $V_1$ of binary 1. The dual-control grid gating tubes are biased with a positive voltage on the cathode as is shown in the drawing so that a few volts increase on one of the control grids opens the gate; or in other words, places the tube in such a condition that upon receipt of a pulse on the other control grid, the tube will conduct. Thus, with the multi-stable state circuit in the assumed condition, tube $V_2$ of binary 5 is not conducting and, therefore, serves to apply a positive voltage to the control grid of the gating tube $V_3$ connected to the input of the tube $V_1$ of the first binary.

Now let it be assumed that a positive input pulse 56 is applied to the input terminal. This positive input pulse will be applied to all the gates. However, as explained previously in conjunction with FIGURE 4, the input pulse is effective only with respect to one side of one of the binaries because only one gate to the on-sides of the binaries is open and any other gates which are open are connected to off-sides of the binaries.

The first input pulse 56, therefore, causes the tube $V_3$ connected to binary 1 to conduct and the negative going output voltage is applied to the grid of the tube $V_1$ to cause binary 1 to shift to its other stable state in a manner similar to that hereinbefore described. As the tube $V_1$ of binary 1 is rendered non-conducting, the positive going signal from the plate of the tube $V_1$ is applied to one of the control grids of the dual-control grid tube $V_3$ to open that gate so that binary 2 will be in condition to receive the next pulse which is applied to the input circuit. The gate will be opened very rapidly after the application of the first input pulse because the gate will be opened by the first portion of the switching waveform of the tube $V_1$ of binary 1.

The receipt of the next input pulse will cause binary 2 to be switched from its one stable state to the other stable state and the gate tube $V_3$ connected to the input of binary 3 will be opened. This sequence of operation continues up the right-hand side or side B as viewed in FIGURE 8 and then up the left-hand side or side A so that the multi-stable state circuit has progressed through all ten of its stable states upon receipt of ten successive pulses. Receipt of additional pulses causes the same sequence of operations to occur commencing with the first stable state.

It is apparent from the foregoing description that only one binary is shifted from one stable state to another by the receipt of one input pulse and that succeeding binaries are only shifted by succeeding pulses which may follow at a regular or random rate.

This multi-stable state circuit has many of the advantages of the embodiments hereinbefore described in that it is very fast, and represents a great improvement over conventional scaling or counting circuits.

Heretofore, in binary chains, to improve the resolution of the binary chain, it has been the practice to compromise between the triggering time and the recovery time of the binary. Normally, when the triggering of the binary is fast, recovery is slow; and on the other hand, when the recovery is fast, the triggering requirements are too critical. With my circuitry, no compromise is necessary and the binary can be made to trigger as fast as possible because the recovery time has been eliminated as a limiting factor.

For example, with a one megacycle binary, and utilizing the type of circuitry shown in FIGURE 8, it is possible to construct a scaling device which can count or scale up to five times more rapidly than conventional circuits using the same binary. With a scale of ten scaling device, the advantages of my circuitry are even more evident because in conventional scale of ten circuits there is a loss of resolution by approximately a factor of 3 because of feedback loops which means that with a 1 megacycle binary, it would be possible to only construct a one-third to one-half megacycle decimal counting unit. My circuitry employing such a binary would have a scaling advantage by a factor of 10 to 15.

My circuitry also has all the advantages pointed out before, that is, the recovery time and a portion of the switching time is saved when opening the gate to a succeeding binary stage so that the resolution of the entire circuit is improved greatly. It is possible for my circuitry to have counted several pulses before the first tube in the series has recovered to such an extent that it would be responsive to another input pulse if the gate were open. Thus, it is clear that the resolution of the device is not limited by the resolution of any one binary.

Although triodes for binaries, pentodes for phase inverters, and dual control grid tubes for gating were used in conjunction with the circuitry shown in FIGURES 5, 7 and 8, it is readily apparent that other types of tubes, transistors, and other semiconductor devices (all of which are non-linear active elements) with suitable circuit arrangements may be substituted, if desired.

It is apparent from the foregoing that I have provided a new and improved multi-stable state circuit which has many possible applications such as for time interval measurements and scaling or counting. The circuitry is arranged in such a manner that the resolution and the maximum counting rate is increased greatly in comparison with conventional circuitry used for the same purpose. The circuitry has additional advantages when measuring or scaling in units of ten.

I claim:

1. In a multi-stable state circuit, a plurality of binaries, each of the binaries having two sides, each side of each of the binaries having an input and an output, a pair of gates associated with each binary, each of the gates having two inputs and one output, means connecting the output of one of the gates associated with the binary to the input of one side of the binary, means connecting the output of the other of the gates associated with the binary to the input of the other side of the binary, means connecting the output of one side of the binary to one of the inputs of one of the gates associated with the succeeding binary, means connecting the output of the other side of the binary to one of the inputs of the other of the gates associated with the succeeding binary, the means connecting both sides of each binary to the gates of the succeeding binary connecting the binaries into a closed series loop, and means for applying an input signal to all the other inputs of the gates substantially simultaneously, each of said gates supplying a signal to the associated binary only if both inputs of the gate receive a signal substantially simultaneously regardless of the input levels of the signals applied to the inputs of the gates above a minimum threshold level, said two sides of each of said binaries being capable of assuming on and off conditions, all of the gates having said one inputs connected to off binary sides receiving signals on said one inputs.

2. In a multi-stable state circuit, a plurality of binaries, each of the binaries having two inputs and two outputs, an active gate associated with each input of each binary and having two inputs and one output, means connecting the output of the gate to the associated input of the binary, means connecting the outputs of each binary to one of the inputs of each of the gates associated with the succeeding binary to connect the binaries into a closed series loop so that they are all turned on in succession before any binary is turned off and all turned off in succession before any binary is turned on, and means for applying an input signal to the other of the inputs of all of the gates substantially simultaneously, each of the gates supplying a signal to the associated binary only if both inputs of the gate receive a signal substantially simultaneously and regardless of the input levels of the signals applied to the inputs of the gates above a minimum threshold level, all of the gates having said one inputs connected to off binary sides receiving signals on said one inputs.

3. In a multi-stable state circuit suitable for scaling or counting, a plurality of binaries arranged from first to last and having first and second sides each being capable of assuming conducting or nonconducting conditions, each side having an input and an output, an active gate associated with each input of each binary, each gate having two inputs and one output, means connecting the output of the associated gate to the associated input of the binaries, means connecting the output of the first side of the last binary to one of the inputs of one of the gates connected to the first binary, means connecting the output of the second side of the last binary to one of the inputs of the other gate connected to the first binary, means connecting the output of the first side of each of the other binaries to one of the inputs of one of the gates connected to the succeeding binary, means connecting the output of the second side of each of the other binaries to one of the inputs of the other gate connected to the succeeding binary, means connecting input events to the other input of each of the gates substantially simultaneously, each of the gates supplying a signal to the associated binary only if both inputs of the gate receive signals substantially simultaneously regardless of the input levels of the signals applied to the inputs of the gates above a minimum threshold level, all of the gates having said one inputs connected to sides in a non-conducting condition receiving signals on said one inputs, and means connected to each of the binaries for resetting the binaries, the binaries in a reset condition having the same side of each of the binaries conducting.

4. A multi-stable state circuit as in claim 3 wherein the first and second sides of the last binary are connected to the inputs of the gates connected to the second and first sides respectively of the first binary and wherein the means connecting the outputs of the first and second sides of each of the other binaries are connected to the inputs of the gates connected to the first and second sides respectively of the succeeding binary.

References Cited in the file of this patent

UNITED STATES PATENTS

| | | |
|---|---|---|
| 2,136,621 | King et al. | Nov. 15, 1938 |
| 2,416,095 | Gulden | Feb. 18, 1947 |
| 2,629,827 | Eckert et al. | Feb. 24, 1953 |
| 2,644,887 | Wolfe | July 7, 1953 |
| 2,764,343 | Diener | Sept. 25, 1956 |
| 2,787,416 | Hansen | Apr. 2, 1957 |
| 2,790,077 | Hinckley et al. | Apr. 23, 1957 |
| 2,973,438 | Clark | Feb. 28, 1961 |

OTHER REFERENCES

The Review of Scientific Instruments—Decade Connecting Circuits, vol. 17, No. 5, May 1946.

Journal of Scientific Instruments—A Cycle Electronic Counter—British, vol. 25, April 1948.

Millman & Taub: Pulse and Digital Circuits, McGraw-Hill Book Co., Inc., 1956.